United States Patent [19]

Clark

[11] Patent Number: 5,558,739

[45] Date of Patent: Sep. 24, 1996

[54] APPARATUS AND PROCESS FOR APPLYING GLUE TO EDGES OF INSULATION TUBE SLIT

[75] Inventor: R. James Clark, Fort Worth, Tex.

[73] Assignee: Insulation Materials Corporation of America, Haltom City, Tex.

[21] Appl. No.: 325,706

[22] Filed: Oct. 19, 1994

[51] Int. Cl.[6] ...................................................... B29C 53/50
[52] U.S. Cl. ........................ 156/203; 156/218; 156/289; 156/304.1; 156/324; 156/466; 156/544; 156/545; 156/554; 156/578
[58] Field of Search ............................... 156/218, 304.3, 156/306.6, 203, 247, 544, 545, 289, 304.1, 324, 466, 578

[56] References Cited

U.S. PATENT DOCUMENTS

| | | |
|---|---|---|
| 3,691,990 | 9/1972 | McCabe . |
| 3,782,994 | 1/1974 | Doherty . |
| 3,821,939 | 7/1974 | Doherty . |
| 4,584,217 | 4/1986 | McClintock . |
| 4,606,957 | 8/1986 | Cohen . |
| 4,687,530 | 8/1987 | Berscheid et al. . |
| 4,713,271 | 12/1987 | Searl et al. . |
| 4,778,700 | 10/1988 | Pereira . |
| 4,780,347 | 10/1988 | Cohen . |
| 4,857,371 | 8/1989 | McClintock . |
| 5,069,969 | 12/1991 | McClintock et al. . |
| 5,070,597 | 12/1991 | Holt et al. . |
| 5,104,701 | 4/1992 | Cohen et al. . |
| 5,123,453 | 6/1992 | Robbins . |
| 5,234,520 | 8/1993 | McClintock . |
| 5,419,859 | 5/1995 | Hartman et al. ................. 156/218 |

*Primary Examiner*—Geoffrey L. Knable
*Attorney, Agent, or Firm*—James E. Bradley; Grady K. Bergen

[57] ABSTRACT

An apparatus and method for applying adhesive on opposite edges of a longitudinal slit formed in a tubular body of resilient insulation material is provided. The apparatus includes a conveyor which moves the tubular body along a conveyor path. A feed assembly feeds a pair of tape strips along separate feed paths so that an adhesive applicator located adjacent to each feed path at an application point applies adhesive to a surface of the tape strip as it is fed along the feed path. A wedge-shaped plow is formed from a pair of flat plates which converge at an acute angle toward one another. The flat plates each have a leading edge which directs each tape strip from the feed paths along an exterior surface of one of the plates along lines parallel with the conveyor path. The lead edges of the plates engage the slit of the tubular body as the tubular body is moved along the conveyor path so that the edges of the slit are directed along the exterior surfaces of the plates with the edges of the slit contacting the tape strips. This causes the tape strips and adhesive to be applied to the opposite edges of the slit. A mandrel supports the tubular body as it is moved along the conveyor path into engagement with the plow so that the tubular body is held in a substantially tubular form.

21 Claims, 6 Drawing Sheets

APPARATUS AND PROCESS FOR APPLYING GLUE TO EDGES OF INSULATION TUBE SLIT

BACKGROUND OF THE INVENTION

1. Field of the Invention

This invention relates to an apparatus and method for applying adhesive to the edges of a slit formed in a resilient tubular body. More particularly, this invention relates to an apparatus and method for applying glue or adhesive to the edges of slit tubular pipe insulation.

2. Description of the Prior Art

Pipe insulation is usually formed as a tubular body from a foamed polymeric material, such as polyethylene. The pipe insulation is formed in an extrusion process wherein a blowing agent is injected or pumped into an extruder under high pressure and mixed with the polymeric material to be extruded. The polymeric material is then passed through a die head. As the polymeric material passes through the die head, the reduction in pressure causes the blowing agent to expand within the polymeric material to produce the cells of the foam.

Once the pipe insulation has been extruded, it is cut into initial lengths for further processing and stored for a period of time to cure, allowing the blowing agent within the cells of the foam to diffuse and be replaced with air. After the pipe insulation is cured it can be processed further. This typically involves providing the pipe insulation with a longitudinal slit which allows the pipe insulation to be easily positioned around a length of pipe to be insulated. Glue or adhesive is also applied to the edges of the slit so that the edges can be secured together once the pipe insulation is installed around the pipe.

The longitudinal slit is formed by feeding the lengths of pipe insulation, one at a time, to a slitter which is provided with a blade or cutting element which cuts through the wall of the pipe insulation. Puller belts used to feed the insulation through the slitter are also used to deform the pipe insulation by squeezing the walls of the insulation together. The deformation of the pipe insulation by the puller belts causes the edges of the slit to be spread apart after it is formed. A plow further flattens the edges of the slit so that the edges lie in a single plane 180° apart. A pressure sensitive adhesive is then applied to the edges of the slit. This may be accomplished by applying the adhesive to a single strip of polyester tape, such as Mylar, which is then placed over the edges of the slit so that the adhesive is applied to the edges. The pipe insulation is then allowed to spring back to its original shape wherein the tape strip is folded over on itself between the edges of the slit with the edges of the slit facing one another. The tape acts as a release liner which prevents the edges from sticking together before use. After the slit is formed and adhesive has been applied to the edges as described above, the pipe insulation may then be cut again into appropriate lengths for packaging and shipment to the end user.

Due to the extreme deformation that the pipe insulation undergoes in the prior art methods of forming the slit and applying adhesive, further processing of the pipe insulation in this manner immediately after it is extruded usually results in damage to the pipe insulation caused by the collapsing or rupturing of the foam cells. Thus it is essential that the pipe insulation be allowed to cool and cure after it is extruded. While the cured foam undergoes less damage, it takes longer to process and requires numerous handling steps.

What is needed is a means for applying adhesive to the edges of the slit of tubular pipe insulation which does not crush or deform the pipe insulation to a significant degree and which can be used immediately after the pipe insulation has been extruded and prior to curing so that the insulation can be cut to length for packaging and shipment.

SUMMARY OF THE INVENTION

An apparatus and method for applying adhesive to opposite edges of a longitudinal slit formed in a tubular body of resilient insulation material is provided. The apparatus includes a conveyor which moves the tubular body along a conveyor path. A feed assembly feeds a pair of tape strips along separate feed paths. An adhesive applicator located adjacent to each feed path at an application point applies adhesive to a surface of each tape strip as it is fed along the feed path. A wedging member is formed from a pair of flat plates which converge at an acute angle toward one another. The flat plates each have a guide portion which directs each tape strip from the feed paths along an exterior surface of one of the plates along lines parallel with the conveyor path. The lead edges of the plates engage the slit of the tubular body as the tubular body is moved along the conveyor path so that the edges of the slit are directed along the exterior surfaces of the plates with the edges of the slit contacting the tape strips. This causes the tape strips and adhesive to be applied to the opposite edges of the slit. A means for supporting the tubular body as it is moved along the conveyor path is also provided for holding the tubular body in a substantially tubular form as it engages the wedging member.

DETAILED DESCRIPTION OF THE INVENTION

Figure 1:
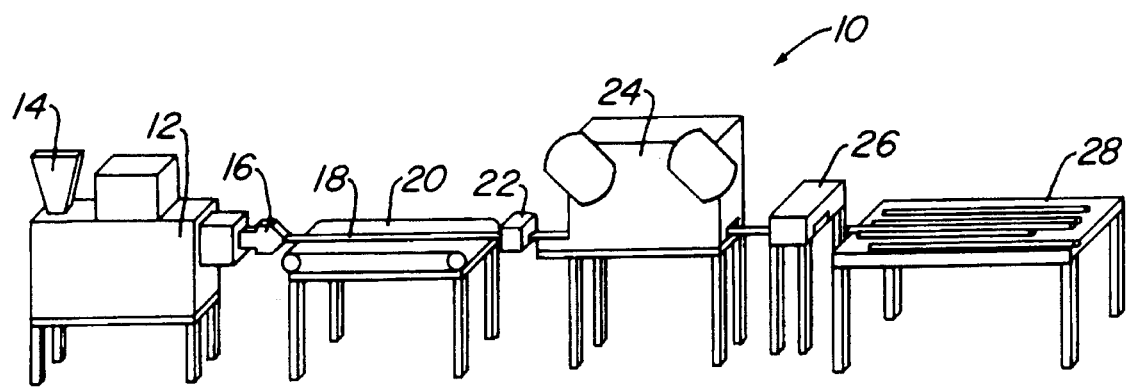
FIG. 1 is a schematic view of a process line for forming tubular pipe insulation including an apparatus for applying adhesive to edges of a slit of the tubular pipe insulation constructed in accordance with the invention.

Referring to FIG. 1, a process line 10 is shown which is used in forming tubular pipe insulation. The process line 10 is comprised of an extruder 12 having a feed hopper 14 for introducing raw material used in the extrusion of the pipe insulation. The material may be any type of polymeric material which is known in the art used in the construction of foam pipe insulation. Usually, the raw polymeric material used in forming the insulation is introduced into the feed hopper 14 in a solid pellet or bead form. Other additives, such as blowing agents, lubricants, fire retardants and coloring agents may also be introduced into the extruder 12 through the feed hopper 14. A screw (not shown) rotates within a barrel (not shown) of the extruder such that the raw materials introduced into the extruder 12 are subjected to shear and compressive forces by the screw so that the raw material heats and melts. Typically, the temperatures within the extruder may be between 275° to 325° F. The melted material within the extruder 12 is passed through a die head 16 where the reduced pressure upon passing through the die head 16 causes the polymeric material to foam, thus producing the tubular body which forms the pipe insulation 18. As the pipe insulation 18 passes through the die head 16 it is delivered to a conveyor 20 which is synchronized with the extruder 12 so that the conveyor 20 carries the pipe insulation 18 away from the extruder 12 at the rate of extrusion.

The extruded pipe insulation 18 is fed from the conveyor 20 to a pipe insulation slitter 22 which forms a single slit extending along the length of the pipe insulation 18. The slit pipe insulation 18 is passed from the slitter 22 to an adhesive application apparatus 24 of the invention. The adhesive applying apparatus 24 supplies glue or adhesive and applies it to the edges of the slit pipe insulation 18. After adhesive has been applied to the edges of the pipe insulation 18, it is fed to a cutter 26 where the pipe insulation 18 is then cut into desired lengths. From the cutter 26 the pipe insulation is collected in a collection area 28 where it is then removed for packaging, storage or shipment.

Figure 2:
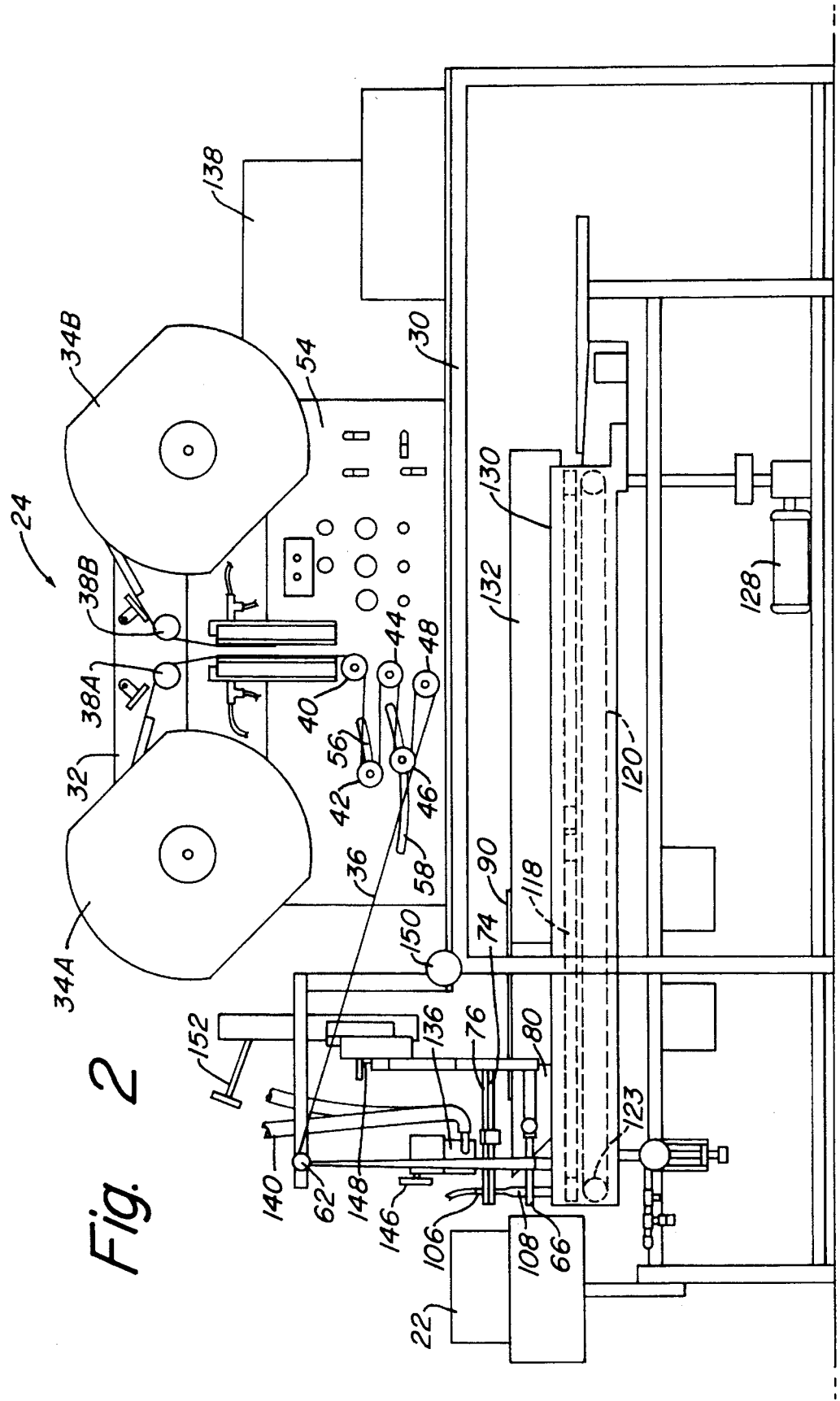
FIG. 2 is a side view of the apparatus used in applying adhesive to the edges of the slit of the tubular pipe insulation constructed in accordance with the invention.

Referring now to FIGS. 2–7, the adhesive application apparatus 24 has a frame 30. While only one is shown in FIG. 2, the frame 30 supports a pair of tape feed assemblies 32 which are located on opposite sides of the frame 30. Each tape feed assembly 32 is constructed similarly and has a pair of tape feed reels 34A, 34B. The tape feed reel 34A is a forward reel and the reel 34B is a rearward reel. An elongated strip of Mylar tape 36 which forms a release liner is fed from one of the two tape reels 34A, 34B on each tape feed assembly 32. Each tape reel 34A, 34B holds approximately 1500 feet of tape. The tape reels 34A, 34B feed tape to guide rollers 38A, 38B, respectively. The tape reels 34A, 34B can be used interchangeably to feed tape from the guide rollers 38A, 38B through a series of rollers 40–48 so that tape is supplied without interruption by switching back and forth between the two reels 34A, 34B.

Located between the guide rollers 38A, 38B are a pair of vacuum platens 50. Each vacuum platen 50 is connected to vacuum hoses 52 which create a slight vacuum across the surface of each of the platens 50 to temporarily secure the tape 36 in place prior to threading the tape 36 through the rollers 40–48 when switching between the reels 34A, 34B. The vacuum platen 50 as well as other components of the apparatus 24 are controlled from the control panel 54. The rollers 42, 46 are each mounted on shafts which extend from arcuate slots 56, 58 and are spring biased away from the rollers 40, 44, 48, which are stationarily mounted to the feed assembly 32. The slots 56, 58 allow the shafts of the rollers 42, 46 to move within the slots so that as the tape 36 is fed around each of the rollers 40–48, the spring biased rollers 42, 46 take up slack and maintain tension on the tape 36 as it is being fed.

Figure 3:
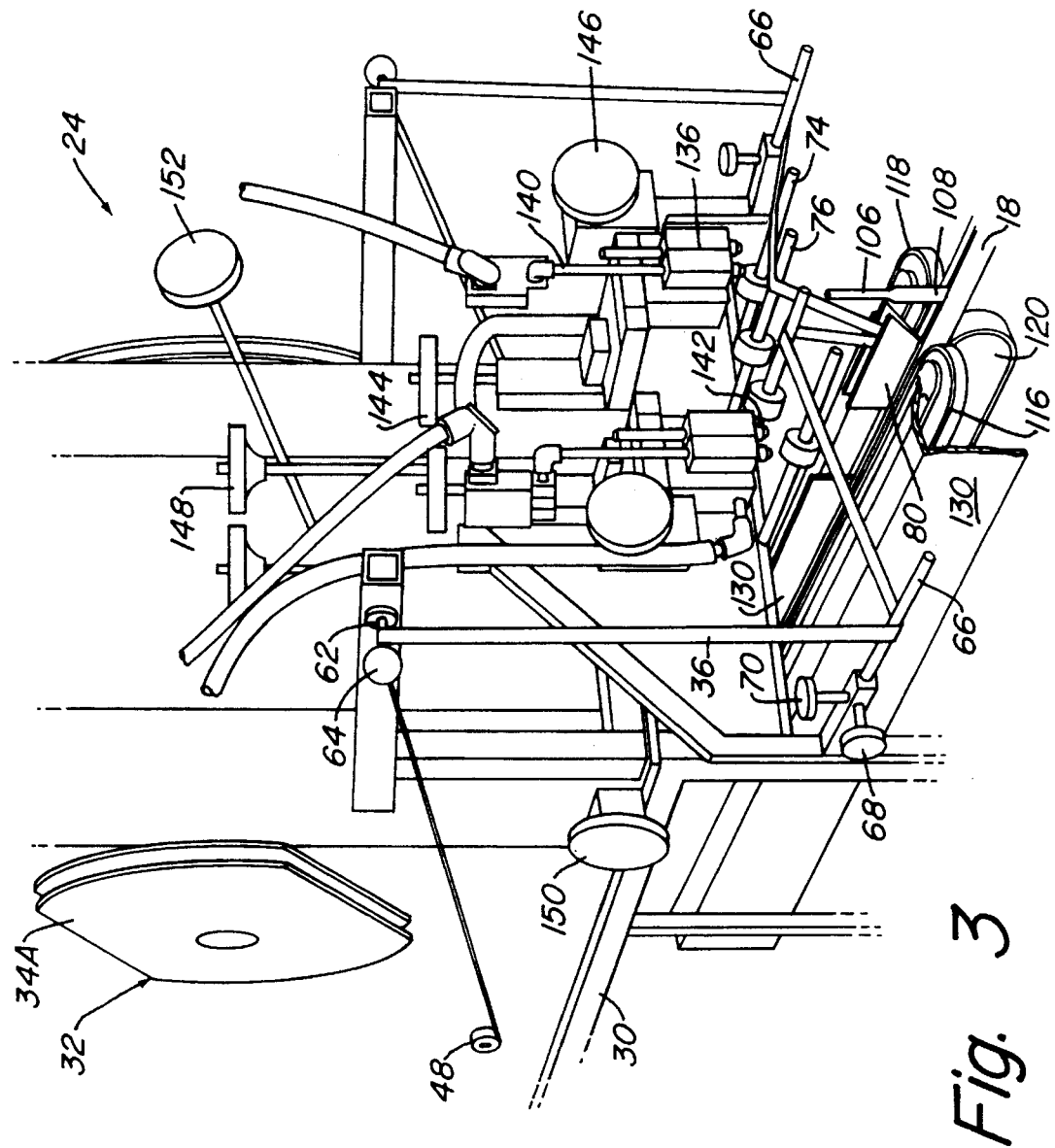
FIG. 3 is a front prospective view of the apparatus of FIG. 2.

Tape 36 from each of the tape feed assemblies 32 is passed from the lower roller 48 to an elevated guide rod 62 which extends laterally outward from each side of the frame 30 near the forward end of the apparatus 24. Each guide rod 62 has retaining means 64 (FIG. 3) at its free end which prevents the tape 36 from slipping off the end of the guide rod 62 as it is being fed. The tape 36 is directed downward from each guide rod 62 along individual feed paths to a forward protruding guide rod or finger 66 which is perpendicular to the guide rod 62 and substantially parallel with a longitudinal axis of the apparatus 24. The guide rod 66 has a longitudinal adjustment 68 and a vertical adjustment 70 which can be used to adjust the position of each guide rod 66. Each strip of tape 36 is passed underneath one of the guide rods 66 so that it is turned approximately 90° inwards toward adjacent guide fingers 74, 76. As shown in FIG. 3, the guide fingers 74, 76 are substantially parallel with the guide rod 66, however, the guide fingers 74, 76 are spaced laterally inward and slightly elevated above the guide rod 66 so that the tape 36 loops over the guide fingers 74, 76. The innermost guide finger 76 is positioned slightly higher than the guide finger 74 with the tape 36 contacting a portion of each guide finger 74, 76.

Figure 4:
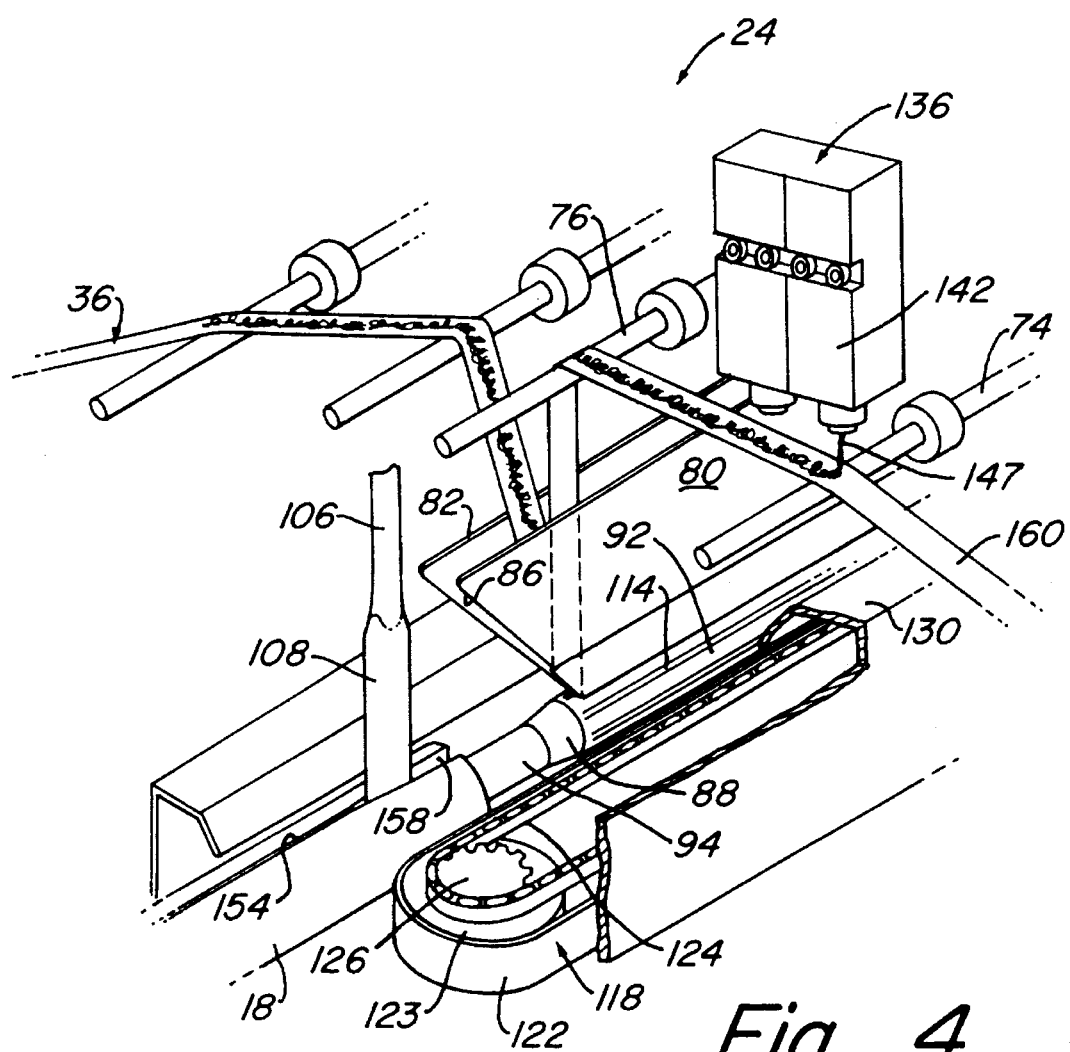
FIG. 4 is a front prospective view of the apparatus of FIG. 2 showing the tubular pipe insulation as it is fed along a conveyor path to a mandrel.
Figure 5:
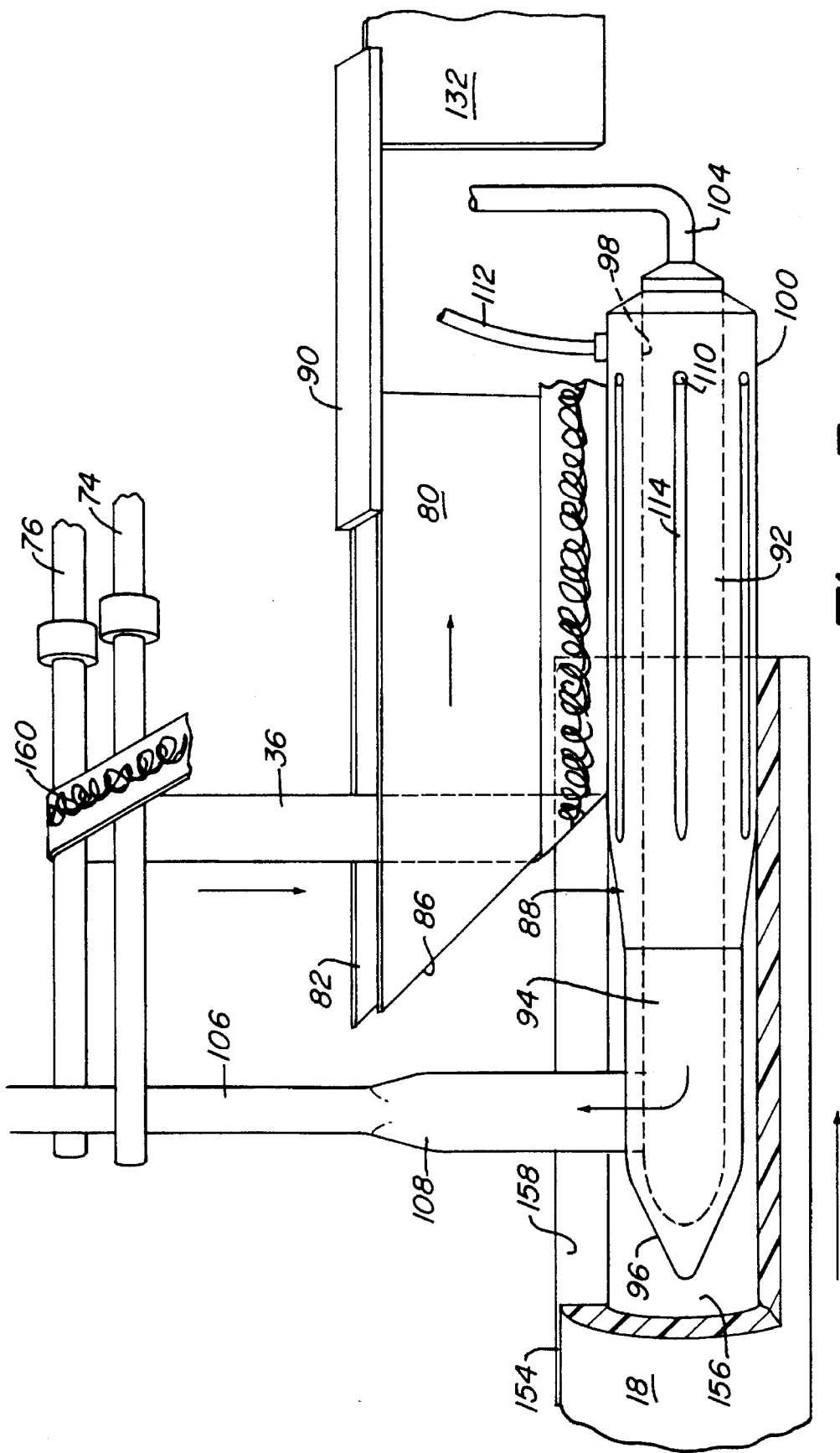
FIG. 5 is a side view of the mandrel and a plow of the apparatus of FIG. 2 with a partially sectioned view of the pipe insulation as it is fed along the conveyor path.

Each strip of tape 36 is directed from the innermost guide finger 76 downward to a wedge-shaped plow 80, as shown in FIG. 5. The plow 80 consists of a pair of plates 82 or blades which are joined along a lower edge 84 (FIG. 6) at an acute angle of approximately 5° relative to each other. The lower edge 84 is parallel to the longitudinal axis of the apparatus 24. Extending forward from the lower edge 84 is a leading edge 86 of each blade or plate 82 which projects forward and upward at an angle of approximately 45° relative to the lower edge 84. As can be seen in FIGS. 4 and 5, the two strips of tape 36 from the inner most guide fingers 76 are directed downward between the plates 82 along the forward portion of the plow 80. Each strip of tape 36 is folded rearward about the leading edge 86 of one of the plates 82 so that it is directed 90° along the exterior surface of the plow 80 adjacent to the lower edge 84 so that the tape 36 is parallel with the longitudinal axis of the apparatus 24.

The lower edge 84 of the plow 80 rests against a pipe insulation mandrel 88 of the apparatus 24. Plow retainer means 90 secures the plow 80 so that it is positioned against the mandrel 88 and allows the plow 80 to be selectively replaced or removed.

Figure 6:
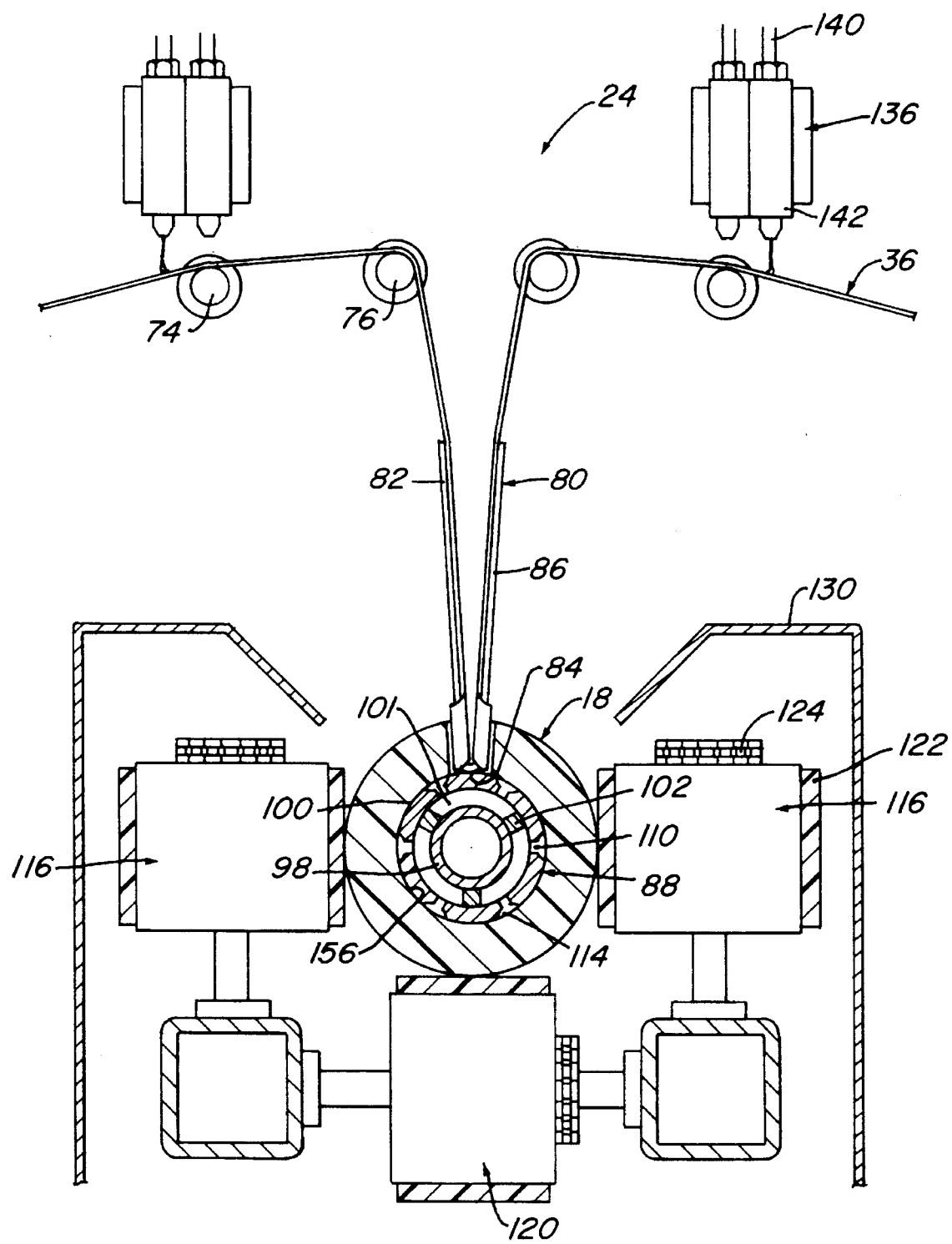
FIG. 6 is a transverse cross-sectional view of the mandrel and puller belts of the apparatus of FIG. 2 as the tubular pipe insulation engages the plow.
Figure 7:
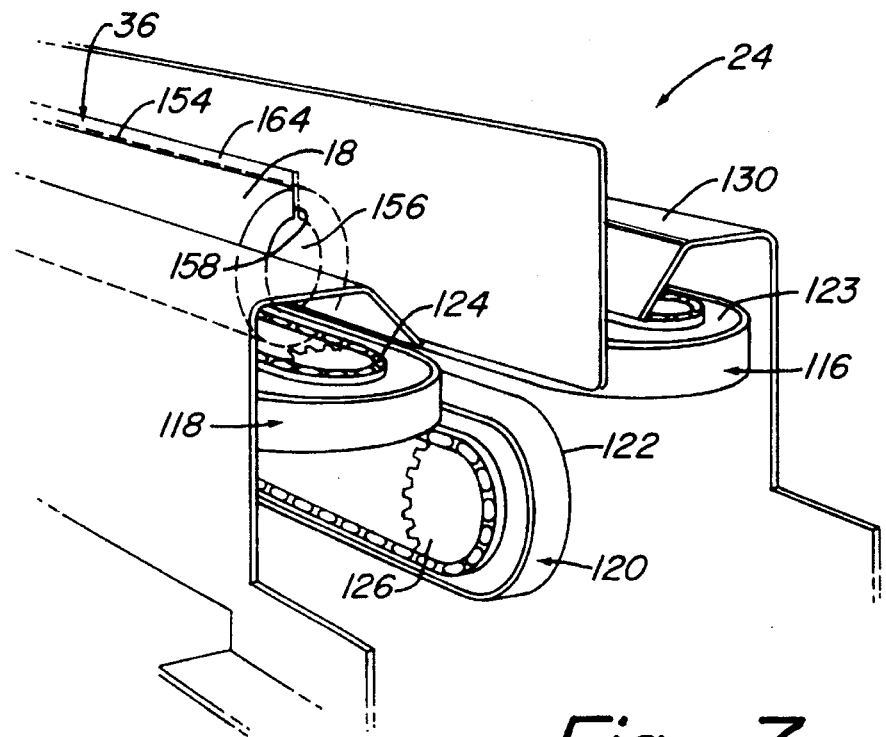
FIG. 7 is a rear prospective view of the apparatus of FIG. 2 showing the puller belts conveying the pipe insulation along a guide plate after adhesive has been applied to the edges of the slit.

The mandrel 88 is formed of metal and is generally cylindrical in shape. The mandrel 88 is parallel to the longitudinal axis of the apparatus 24. The mandrel 88 is comprised of a rearward portion 92 having a substantially uniform diameter along its length which tapers or necks down approximately ⅛ of an inch to a forward portion 94. The mandrel 88 terminates at its forward end in a conical section 96 for facilitating the mounting of the pipe insulation 18 onto the mandrel 88 as it is fed from the slitter 22. As seen in FIG. 6, the mandrel 88 is formed with a inner conduit 98 which is concentric with and housed within an outer conduit 100 of the mandrel 88. The inner conduit 98 is spaced radially inward from the inner surface of the outer portion 100 of the mandrel 88 to define an annular space 101. The inner conduit 98 is joined to the outer portion 100 by means of spacers 102. The spacers 102 are formed from a thermally conductive material to facilitate heat transfer between the outer portion 100 of the mandrel 88 and the inner conduit 98.

Cooling water is introduced into the inner conduit 98 through an inlet 104 located at the rearward portion of the mandrel 88. The cooling water flows through the inner conduit 98 and out through the forward portion 94 of the mandrel 88 through a length of metal tubing 106. A portion of the metal tubing 106 is partially flattened to create a separator blade 108 which projects upward from the forward portion 94 of the mandrel 88. The separator blade 108 lies in a plane parallel to the longitudinal axis of the mandrel 88 and separates the edges of the slit of the pipe insulation 18 as it is fed onto the mandrel 88. The flattened portion 108 is hollow to allow the cooling water to flow out of the inner conduit 98 through the remainder of the tubing 106.

Formed in the outer portion 100 of the mandrel 88 are circumferentially spaced apart holes 110. Pressurized air is supplied to the mandrel 88 through an air feed 112 located in the rearward portion 92 of the mandrel 88 behind the plow 80. The pressurized air supplied from the air feed 112 flows through the annular space 101 and out the holes 110. The holes 110 open into the rearward ends of longitudinal grooves or channels 114 formed in the exterior surface of the rearward portion 92 of the mandrel 88. When the pipe insulation 18 passes over the mandrel 88, the air from the holes 110 is forced into the grooves 114 and creates an air bearing and cooling means for the pipe insulation 18 as it is fed over the rearward portion 92 of the mandrel 88.

Located on either side of the mandrel 88 are longitudinal pull belts 116, 118. The pull belts 116, 118 are each spaced an equal distance from and are parallel with the mandrel 88. The pull belts 116, 118 are laterally spaced apart from each other approximately a distance slightly less than the width of the pipe insulation 18 which is fed onto the mandrel 88. A lower pull belt 120 is located beneath and spaced below the mandrel 88 a distance equal approximately to the thickness of the wall of the pipe insulation 18. Each pull belt 116, 118, 120 is provided with a natural rubber layer 122 for contacting the pipe insulation 18. The belts 116, 118, 120 are mounted around rollers 123 driven by a roll chain 124 and sprockets 126 which are driven by a motor 128 (FIG. 2).

The lower pull belt 120 runs continuously from one end of the conveyor path to the other. The pull belts 116, 118, however, are formed as a forward set and a rearward set which are positioned in series. The rearward set of pull belts 116, 118 may be spaced slightly closer together than the forward set of pull belts 116, 118.

A belt guard cover 130 encloses the pull belts to prevent accidental contact with the pull belts 116, 118, 120 during operation. A longitudinal guide plate 132 is aligned with the plow 80 and extends along the entire length of the conveyor path parallel to the pull belts 116, 118, and 120. The guide plate 132 is a vertically positioned metal plate which is used to separate the edges of the slit of the pipe insulation 18 as it is fed along the conveyor path by means of the pull belts 116, 118, 120.

Mounted directly above each set of guide fingers 74, 76 and positioned along the feed path of the tape strips 36 as they pass over the guide fingers 74, 76 are glue heads 136. The glue used can be raw glue or it may be foamed with a gas, such as nitrogen gas. A glue pot 138 stores and heats the glue to be used with the pipe insulation 18. Glue is pumped from the glue pot 138 by means of a pump (not shown) which pumps the glue through a conduit 140 to each of the glue heads 136. In the embodiment shown in FIG. 6, one glue head 136 is located along each feed path above the guide fingers 74, 76.

Each glue head 136 has two nozzles 142 for applying the glue to the tape 36 as it is fed along the feed path over the guide fingers 74, 76 to the plow 80. During operation only one nozzle 142 on each glue head 136 is used at a time. However, if necessary, the other could be used simultaneously to provide a wider glue pattern or to increase the amount of glue applied when faster line speeds are used. Each glue head 136 can be adjusted in position by means of a vertical glue head adjustment 144 (FIG. 3) and a longitudinal adjustment 146. The width of the glue stream 147 dispensed from the nozzles 142 can be adjusted by raising and lowering the glue heads 136 with the vertical adjustment 144. Likewise, the position of the glue stream 147 over the surface of the tape can be adjusted between a forward edge and a rearward edge of the tape 36 by means of the longitudinal adjustment 146.

Both the glue heads 136 and the guide fingers 66, 74, 76 can be raised and lowered together relative to the plow 80 by means of vertical and longitudinal adjustments 148, 150, respectively. The vertical adjustment 148 effectively adjusts the length of the feed path of each tape strip 36 by raising and lowering the glue heads 136 together with the guide fingers 66, 74 and 76 relative to the plow 80. The longitudinal adjustment 150 is used to vary the longitudinal position of the tape strips 36 relative to the plow 80.

A glue pot feed control 152 connected to a valve (not shown) adjusts the quantity of glue fed from the glue pot 138 to the glue heads 136.

The operation of the apparatus 24 and method of applying adhesive to the edges of the slit pipe insulation is as follows. Pipe insulation 18 which is extruded from the extruder 12 is fed by means of the conveyor 20 to the slitter 22 to form a single longitudinal slit 154 (FIG. 4). The slit pipe insulation 18 is fed from the slitter 22 to the adhesive application apparatus 24. Initially, this may be done by hand until the forward pull belts 116, 118 and the lower pull belt 120 engage the pipe insulation 18 and begin pulling the pipe insulation through the slitter 22.

When the pipe insulation 18 is fed to the apparatus 24, the central opening 156 (FIG. 5) receives the forward end of the mandrel 88 and the pipe insulation 18 is pulled along the conveyor path by the pull belts 116, 118 and 120. The pull belts 116, 118 and 120 should be set at the same speed as the conveyor 20 which feeds the pipe insulation 18 to the slitter 22. Typically, the apparatus can process the pipe insulation 18 at a speed between 40 to 90 feet per minute to correspond to the rate of extrusion.

When the slit 154 is cut, the pipe insulation 18 contracts slightly, causing opposite edges 158 of the slit 154 to pull away from each other. Because the pull belts 116, 118 are spaced apart a distance less than the width of the insulation 18, the pull belts 116, 118 will pinch the pipe insulation 18 slightly so that the edges 158 of the slit 154 are forced together. As the pull belts 116, 118 and 120 convey the pipe insulation over the forward portion 94 of the mandrel 88, the separator blade 108 engages the slit 154 so that the edges 158 are forced apart, as shown in FIG. 4. The pipe insulation 18 is then directed over the rearward portion 92 of the mandrel 88 so that the leading edges 86 of the plow 80 engage the slit 154.

Prior to feeding the pipe insulation 18 over the mandrel 88, two strips of Mylar tape 36 are each manually threaded from the tape feed assemblies 32 to the plow 80. Each strip of tape 36 is fed from the reels 34A, 34B over the rollers 38A, 38B and passed over the vacuum platen 50 so that the end of the tape strip 36 from each reel 34A, 34B is held in place when not in use. It should be noted that the tape 36 can be fed from either of the reels 34A, 34B of each tape feed assembly 32. The tape 36 from one of reels 34A, 34B is then threaded through the remaining rollers 40–48, respectively, and over the adjacent guide rod 62. From each guide rod 62, the strips of tape 36 are directed downward, under the guide rod 66 to the guide rods 74, 76 and downward between the blades 82 of the plow 80 as discussed previously. Each length of tape 36 is then folded about one of the leading edges 86 of the blades 82 so that the strips of tape 36 are directed rearward along the outer surfaces of the plow 80 adjacent to and substantially parallel with the lower edge 86.

Before the pipe insulation 18 engages the plow 80, the tape strips 36 may be pulled manually rearward along the outer surface of the plow 80 to begin feeding the tape 36. As the tape 36 is fed along the feed path from the tape feed assembly 32 over the guide fingers 74, 76, glue from the glue pot 138 is supplied to the glue heads 136 through the conduit 140. The feed control 152 is utilized to control the amount of glue fed to the glue heads 136. The glue or adhesive from the glue heads 136 is applied through the nozzles 142 to the upper surface 160 of the tape 36 (FIGS. 4 and 6) in a spiral pattern as it passes over the guide fingers 74, 76. By lowering the glue heads 136 closer to the surface 160 of the tape 36 using the vertical adjustment 144, the width of the glue pattern can be made smaller. Likewise, by raising the glue heads 136, the width of the glue pattern can be made larger. Also, the position of the glue pattern on the tape 36 can be adjusted by means of the longitudinal adjustment 146 so that glue is dispensed towards either the forward edge or the rearward edge of the tape 36, as viewed in FIGS. 4 and 5.

The tape 36 should be selected so that it has a width equal to the width each of the edges 158 of the slit 154 plus about ¼ inch. Typically, this is between ⅝ to 1¼ inches. Preferably, the glue is deposited on the surface 160 of the tape 36 towards the rearward edge, as viewed in FIGS. 4 and 5, so that the forward edge is free of glue for approximately ¼ inch.

Once the glue heads 136 are properly aligned with the length of the tape 36 which passes over the guide fingers 74, 76, the position of the glue heads 136 and guide rods 66, 74, 76 can be adjusted together to various positions relative to the plow 80 and mandrel 88 by means of the vertical and longitudinal adjustments 148, 150. Typically the length of the tape feed path from the nozzles 142 of the glue heads 136 to the leading edge 86 of the plow blades 82, where the tape 36 is turned rearwards along the conveyor path, is approximately 18 inches. This length allows the glue on the surface 160 of the tape 36 to cool slightly before being applied to the edges 158 of the pipe insulation 18. The glue temperature is typically around 350°–360° F. when it is dispensed from the nozzles 142 of the glue heads 136. To adjust the length of the tape feed path, the glue heads 136 and guide rods 66, 74, 76 are raised and lowered relative to the plow 80 using the vertical adjustment 148. Thus, by raising the glue heads 136 and guide fingers 66, 74, 76 the length of the feed path can be increased. Lowering the glue heads 136 and guide fingers 66, 74, 76 decreases the length of the feed path. The temperature of the glue can also be controlled by adjusting the heat supplied to the glue pot 138. The glue temperature, however, is best controlled by raising and lowering the glue heads 136 and guide rods 66, 74, 76 to adjust the length of the tape feed path.

The glue heads 136 and guide rods 66, 74, 76 are also adjusted longitudinally relative to the plow 80 using the longitudinal adjustment 150. This allows the tape 36 to be positioned and fed from the innermost guide rods 76 downwards toward the leading edges 86 of the plow blades 82 immediately adjacent to the lower edge 84 of the plow 80 so that it aligns with the edges 158 of the pipe insulation 18 as it is fed along the conveyor path.

The mandrel 88 should be sized to fill the central opening 156 of the pipe insulation 18. The mandrel 88 guides the pipe insulation 18 into engagement with the plow 80 and keeps the pipe insulation 18 substantially in its cylindrical shape so that the pull belts 116, 118, 120 do not deform or collapse the pipe insulation 18 as it is fed along the conveyor path. As the pipe insulation 18 engages the plow 80, the edges 158 of the slit 154 are forced apart a slight distance at an angle of approximately 5°, corresponding to the angle of plates 82, and directed along the outer surface of the plow 80 along the lower edge 84 contacting the surface 160 of the tape 36 with the adhesive. Because the edges 158 of the slit 154 are forced inward by the forward pull belts 116, 118, pressure is exerted against the tape 36 so that the pipe insulation 18 begins pulling the tape 36 along the conveyor path. The tape 36 and adhesive are thus applied to the edges 158 of the slit 154. This also causes the tape 36 to be continuously fed along the feed path from the both of the tape feed assemblies 32. Sudden variations in the conveyor speed of the pull belts 116, 118, 120 are accommodated by the spring biased rollers 42, 46.

It should be noted that as the pipe insulation 18 is fed over the mandrel 88 it is still at an elevated temperature of approximately 140° to 150° F. Cooling water which is fed through the inlet 104, through the inner conduit 98 and out of the tubing 106 conducts heat away from the mandrel 88 to help cool the insulation 18 as it passes over the mandrel 88. The pressurized air which is fed through the air feed 112 and out the holes 110 to the grooves 114 serves as an air bearing so that the frictional force between the insulation 18 and the mandrel 88 as it is fed along the conveyor path is minimized. The air also provides additional cooling to the pipe insulation 18 as it passes over the mandrel 88.

As the pipe insulation 18 is fed along the conveyor path past the plow 80, the guide plate 132 engages the slit 154. The guide plate 132 separates the edges 158 of the slit 154 with the tape 36 and adhesive applied and stabilizes the pipe insulation 18 so that it does not twist or dislocate from between the pull belts 116, 118. The second, rearward set of pull belts 116, 118 eventually engages the pipe insulation 18 as it moves along the conveyor path and continues to pull the pipe insulation 18 along the guide plate 132 (FIG. 7) to the cutter 26 located at the rearward end of the apparatus 24. The cutter 26 cuts the pipe insulation 18 into lengths where it is collected at the collection area 28.

The tailing end of the tape 36 on each of the reels 34A, 34B is coated with coloring to indicate that the supply of tape 36 is almost depleted. As the supply of tape 36 from each reel 34A, 34B is depleted, the alternate reel 34A, 34B can be used by attaching the free end of the tape 36 from the unused reel 34A, 34B to the tailing end of the tape 36 from the depleted reel 34A, 34B with a small piece of adhesive tape. This allows the depleted reel 34A or 34B to be replaced and provides uninterrupted feed of the tape 36 from the feed assembly 32.

Figure 8:
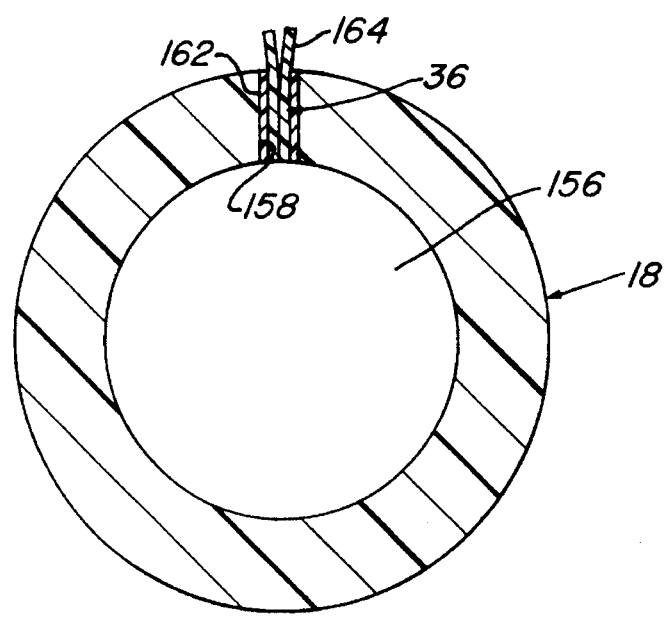
FIG. 8 is a transverse cross-sectional view of the pipe insulation with the adhesive and release liner applied to the edges of the slit in accordance with the invention.

After the adhesive and tape 36 are applied to the pipe insulation 18, the pipe insulation 18 has the configuration shown in FIG. 8. Layers of adhesive 162 on each edge 158 are prevented from contacting one another by the strips of tape 36. In use, the pipe insulation 18 is positioned around a pipe to be insulated with the tape strips 36 still intact. The tape strips 36 are then removed by grasping and pulling the extended portions 164 to expose the adhesive layers 162. The edges 158 are then bonded together.

The apparatus and method of the invention have several advantages over the prior art. Because the apparatus of the invention does not crush or deform the pipe insulation to any great degree, the adhesive and release liner can be applied almost immediately after extrusion in a continuous process. The adhesive is applied simultaneously to both edges of the slit with separate release liners for each edge. The pipe insulation is cut into its final lengths immediately after the adhesive and release liner are applied so that the pipe insulation can be packed or stored for shipping.

While the invention has been shown in only one of its forms, it should be apparent to those skilled in the art that it is not so limited, but is susceptible to various changes without departing from the scope of the invention.

I claim:

1. An apparatus for applying adhesive to an edge of a longitudinal slit formed in a tubular body, the tubular body being formed from a substantially resilient material, the apparatus comprising in combination:

a conveyor for moving the tubular body along a conveyor path;

a feed assembly for feeding an elongate tape strip along a feed path;

an adhesive applicator located adjacent to the feed path for applying adhesive to a surface of the tape strip at an application point as the tape strip moves along the feed path;

a wedging member formed from a pair of flat plates having opposite exterior surfaces which converge at an acute angle, the wedging member having a guide portion for directing the tape strip from the feed path between the pair of plates and then along at least one of the exterior surfaces along lines parallel with the conveyor path, the wedging member engaging the slit of the tubular body as the tubular body is moved along the conveyor path so that the edges of the slit are directed along the exterior surfaces, at least one edge of the slit contacting the tape strip so that adhesive is applied to the at least one edge from the surface of the tape strip; and means for supporting the tubular body as the tubular body is moved along the conveyor path into engagement with the wedging member so that the tubular body is held in a substantially tubular form.

2. The apparatus of claim 1, wherein:

the guide portion is formed from a leading edge of one of the plates.

3. The apparatus of claim 1, wherein:

the means for supporting the tubular body includes a mandrel which inserts into the tubular body as the tubular body is moved along the conveyor path.

4. The apparatus of claim 1, further comprising:

means for adjusting the position of the adhesive applicator relative to the feed path of the tape strip.

5. The apparatus of claim 1, further comprising:

means for adjusting the length of the feed path between the application point and the guide portion of the wedging member.

6. An apparatus for applying adhesive to an edge of a longitudinal slit formed in a tubular body, the tubular body being formed from a substantially resilient material, the apparatus comprising in combination:

a conveyor for moving the tubular body along a conveyor path;

a feed assembly for feeding an elongate tape strip along a feed path;

an adhesive applicator located adjacent to the feed path for applying adhesive to a surface of the tape strip at an application point as the tape strip moves along the feed path;

means for adjusting the position of the adhesive applicator relative to the feed path of the tape strip;

a wedging member formed from a pair of plates, each plate converging at an acute angle toward the other, the wedging member having a guide portion for directing the tape strip from the feed path between the pair of plates and then along an exterior surface of at least one of the plates along lines parallel with the conveyor path, the wedging member engaging the slit of the tubular body as the tubular body is moved along the conveyor path so that the edges of the slit are directed along the exterior surface of the plates, at least one edge of the slit contacting the tape strip so that the tape strip and adhesive are applied to the at least one edge; and a mandrel which inserts into the tubular body as the tubular body is moved along the conveyor path, the mandrel supporting the tubular body as the tubular body is moved along the conveyor path into engagement with the wedging member so that the tubular body is held in a substantially tubular form.

7. The apparatus of claim 6, further comprising:

means for adjusting the length of the feed path between the application point and the guide portion of the wedging member.

8. The apparatus of claim 6, wherein:

the mandrel is formed from metal and has a fluid passage for conducting cooling fluid therethrough.

9. The apparatus of claim 6, wherein:

the mandrel is provided with air passageways which communicate with an exterior surface of the mandrel.

10. The apparatus of claim 6, wherein:

the mandrel is formed from metal and has a fluid passage for conducting cooling fluid therethrough and is provided with air passageways which communicate with an exterior surface of the mandrel.

11. An apparatus for applying adhesive to opposite edges of a longitudinal slit formed in a tubular body, the tubular body being formed from a substantially resilient material, the apparatus comprising in combination:

a conveyor for moving the tubular body along a conveyor path;

a feed assembly for feeding a pair of tape strips along separate feed paths;

an adhesive applicator located adjacent to each feed path for applying adhesive to a surface of each tape strip at an application point as the tape strips are fed along the feed paths;

means for adjusting the position of the adhesive applicator relative to the feed path of each tape strip;

a wedging member formed from a pair of flat plates, each plate converging at an acute angle toward the other, each plate having a lead edge for directing one of the tape strips from one of the feed paths along an exterior surface of the plate along lines parallel with the conveyor path, the lead edges of the plates engaging the slit of the tubular body as the tubular body is moved along the conveyor path so that the edges of the slit are directed along the exterior surfaces of the plates with the edges of the slit contacting the tape strips so that the tape strip and adhesive are applied to the opposite edges of the slit; and means for adjusting the length of the feed paths between the application point and the lead edges of the plates.

12. The apparatus of claim 11, further comprising:
a mandrel which inserts into the tubular body as the tubular body is moved along the conveyor path, the mandrel supporting the tubular body as the tubular body is moved along the conveyor path into engagement with the wedging member so that the tubular body is held in a substantially tubular form.

13. The apparatus of claim 12, wherein:
the mandrel is formed from metal and has a fluid passage for conducting cooling fluid therethrough.

14. The apparatus of claim 12, wherein:
the mandrel is provided with air passageways which communicate with an exterior surface of the mandrel.

15. The apparatus of claim 12, wherein:
the mandrel is formed from metal and has a fluid passage for conducting cooling fluid therethrough and is provided with air passageways which communicate with an exterior surface of the mandrel.

16. A method of applying adhesive to an edge of a longitudinal slit having opposite edges formed in a tubular body, the tubular body being formed from a substantially resilient material, the method comprising the steps of:
moving the tubular body along a conveyor path;
feeding a pair of elongate tape strips along separate feed paths;
applying adhesive to a surface of each tape strip at an application point as each tape strip moves along the feed path;
providing a wedging member having opposite exterior surfaces which converge at an acute angle;
directing each tape strip along one of the exterior surfaces of the wedging member along lines parallel with the conveyor path; and
engaging the slit of the tubular body with the wedging member while the tubular body is held in a substantially tubular form as the tubular body is moved along the conveyor path so that the opposite edges of the slit are directed along the exterior surfaces with each opposite edge of the slit contacting one of the tape strips so that adhesive is applied to each opposite edge from the surface of said one of the tape strips.

17. The method of claim 16, wherein:
the step of applying adhesive to a surface of each tape strip includes applying adhesive at an elevated temperature to the surface of each tape strip.

18. The method of claim 16, wherein:
the step of applying adhesive to a surface of each tape strip includes applying adhesive at an elevated temperature to the surface of each tape strip; and
the step of engaging the slit of the tubular body with the wedging member includes engaging the slit of the tubular body so that the adhesive is at a desired temperature below the elevated temperature when applied to each opposite edge.

19. The method of claim 18, wherein:
the step of engaging the slit of the tubular body so that the adhesive is at a desired temperature below the elevated temperature includes adjusting the length of each feed path between the application point and said one of the exterior surfaces of the wedging member so that ambient conditions cause the adhesive to cool to the desired temperature.

20. The method of claim 16, wherein:
the step of applying adhesive to a surface of each tape strip includes applying adhesive to only a portion of the surface of each tape strip.

21. An apparatus for applying adhesive to an edge of a longitudinal slit formed in a tubular body, the tubular body being formed from a substantially resilient material, the apparatus comprising in combination:
a conveyor for moving the tubular body along a conveyor path;
a feed assembly for feeding an elongate tape strip along a feed path;
an adhesive applicator located adjacent to the feed path for applying adhesive to a surface of the tape strip at an application point as the tape strip moves along the feed path;
a wedging member formed from a pair of flat plates having opposite exterior surfaces which converge at an acute angle, the wedging member having a guide portion formed from a leading edge of one of the plates for directing the tape strip from the feed path along at least one of the exterior surfaces along lines parallel with the conveyor path, the wedging member engaging the slit of the tubular body as the tubular body is moved along the conveyor path so that the edges of the slit are directed along the exterior surfaces, at least one edge of the slit contacting the tape strip so that adhesive is applied to the at least one edge from the surface of the tape strip; and
means for supporting the tubular body as the tubular body is moved along the conveyor path into engagement with the wedging member so that the tubular body is held in a substantially tubular form.

* * * * *